3,186,943
FOAM METHOD FOR ATMOSPHERE CONTROL
Gerald L. Barthauer, Bridgeville, Pa., assignor to Safety Development Corporation, Greenburg, Pa., a corporation of Ohio
No Drawing. Filed Dec. 11, 1961, Ser. No. 158,556
3 Claims. (Cl. 252—3)

This invention relates to improved foam producing material which is usable for generating foam for atmosphere control in fire fighting, decontaminating operations and the like. These are two example applications of the present invention which require a "wet" foam material that must retain a satisfactory water content for a considerable length of time.

In previously filed copending application Serial No. 13,103, entitled "Fire-Fighting Foam Generator," and filed March 7, 1960, in the name of Will B. Jamison, there is disclosed a suitable apparatus for generating water-containing foam material having sufficient mobility and generated in sufficient quantity and rate to provide an effective control over fires of various kinds including mine fires, petroleum field fires and the like which must be brought under control from a distance. It has been found, that the apparatus and method disclosed in the referenced copending application, has added importantly in the field of fire control and the present invention proposes a new and improved foam-producing material which is especially usable with said apparatus to provide an improved foam having more effective fire-fighting qualities.

It has been found that foam, in order to be effective in combating fires, must have a water content sufficient to effect a smothering action on the fire. This does not mean that the foam material "wets" the fire, but rather that sufficient water accompanies the foam so that it will vaporize, forming a blanket of steam which, in turn, in confined by the foam in the vicinity of the fire, to deprive the fire of the necessary amount of oxygen to sustain combustion. Should the foam material lack sufficient water content, it is less effective and it will therefore not function as satisfactory in controlling the fire.

Accordingly, it is an object of the invention to provide a foam-producing material having an addition thereto which renders the foam more water retentive so that it not only is generated with sufficient water, but the foam will also retain an adequate water content for the time period during which it travels from the foam generator to the site of the fire. That is, the drainage rate of water from the foam is impeded with the result that the foam-generating apparatus can be located a safe distance away from the fire where the foam is generated, and as the foam advances to the site of the fire, it will retain a sufficient moisture content to be effective at the time it reaches the fire.

Air foam solution made from air liquid concentrates, e.g., hydrolyzed protein materials, having a low expansion ratio are generally available and when added to water in 3%–6% concentration produce a volumetric increase of about 10/1 to 20/1 when converted from liquid phase to foam material. These same previously used materials are not suitable however for much larger expansion ratios in the order of 50/1 to 2000/1 either because of fragility, inadequate water content, excessive drainage rate, unsatisfactory viscosity or the like. It is an important feature of the present invention that the air foam solution (this term being used throughout the specification in the sense defined by Underwriters' Laboratories, Inc., UL 162, 1st ed., May, 1960, as "being a material as a mixture of an air-foam liquid concentrate in suitable proportions" in water) is capable of usage both as a high expansion and low expansion foam producing material depending upon the foam-generating equipment. In all cases the air foam solution is derived from volumetric dilution of foam liquid concentrate. This is an important advantage to fire fighting personnel who need stock only the single material which can be used with either kind of equipment for producing a particular kind of foam.

It should be understood that the requirements of a high expansion foam are more rigorous and technically more difficult to attain than low expansion foams. It forms an important feature of the present invention that the foam-generating material can meet all of the requirements of a high expansion foam and additionally is usable in equipment which will generate foams of lower expansion ratios which are useful for other fire-fighting applications.

A further object of the invention is to provide an air foam solution which will produce a foam of appropriate average size and which combines, when used in either high or low expansion ratio foams, the requisite properties of stability, mobility, i.e., lightness to enable propulsion, and adequate moisture content. To accomplish these functional requirements, the foam size must be capable of generation in small sizes to produce an emulsion in which case it has high water content but is less easily transported. At the same time, the foam can be made of larger size by other equipment which produces a foam material of less moisture content and characterized by a light billowy construction more readily transported by draft forces and the like. It is therefore an object of the invention to provide a foam-generating material which will produce a suitable size range foam, adapted to a particular fire condition by the selected apparatus. For best results the foam will necessarily vary to meet the particular need.

Another object of the invention, is to produce a foam agent which is capable of producing a foam material having a high expansion ratio in the order of about 50–2000 to 1, meaning that the air foam liquid concentrate will, after it is combined with water and is air blown in the proper manner, produce a foam material having 50–2000 times the volume of the air foam solution. The air foam solution has the further ability, to produce foam very rapidly and with any hardness water ranging from zero hardness to sea water having many thousand parts per million hardness.

Another object of the invention, is to provide air foam solution which is usable with water of varying hardness content, and is capable of producing foam with water ranging in hardness even as high as sea water. This means, that by reason of the present invention, it is possible to generate foam at an acceptable rate, appropriate size, mobility, expansion ratio and water content using water of substantial hardness range extending upwardly in hardness to sea water. Consequently, my invention is readily adapted for maritime use since sea water can be used as the water medium for producing the foam. The present invention, has also made it possible to combine with the foam-producing material an ingredient making foam (regardless of the hardness content), water retentive, so that the foam will have sufficient water content at the time that it reaches the site of the fire to produce its smothering effect.

An overall object of the present invention, is to enlarge the scope of use of a fire-fighting apparatus disclosed in previously-filed application Serial No. 13,103 by making it possible to utilize water of a substantial variation in hardness, ranging from no hardness, to sea water hardness, so that virtually any water supply is suitable for generating the foam. As a result, it is possible to obtain a fire-fighting foam with all of its inherent advantages over conventional processes which can be produced with any municipal or maritime water source; consequently, more people and property can be safeguarded by this invention. Among the advantages which are now made more generally available include; less damage to the area under fire control, greater safety to persons in the vicinity of the fire, improved fire fighting in inaccessible areas and fire fighting from safer distances.

In addition to these foregoing objects it is also intended to produce a foam material which can decontaminate enclosures by removing airborne radioactive particles by aspirating the volume of air into bubbles where the radioactive material is entrapped within bubbles for a sufficient period effecting eventual "wetting" thereof. Thus, when the bubbles burst or drain, the wetted contaminants accompany the liquid phase and are carried down to the floor of the enclosure and are thereby removed, virtually completely, from airborne dispersion to a surface collection which can be washed easily away.

Other objects and features of the present invention, will become apparent from a consideration of the following description, wherein a plurality of selected example embodiments of the invention have been chosen for illustrative purposes.

FOAM GENERATION WITH HARD AND SOFT WATER

When soft water, i.e., low hardness water is used, it is less difficult to generate foam and such foaming agents as ammonium lauryl sulfate are usable for producing both high and low volume expansion ratio foams. To provide an adequate water retentiveness to the foam it is necessary to include with the foaming agent, an alcohol such as lauryl alcohol which increases both the strength and viscosity of the bubble wall and improves thereby its functionality.

The ammonium lauryl sulfate is suitable however only with relatively low hardness water and the lauryl alcohol while improving water retentiveness has no apparent affect on the ammonium lauryl sulfate's inability to generate foam in high hardness water.

To generate foam with high hardness or low hardness water to produce either low or high volume expansion foam I use an alkoxylated ammonium alkyl sulfate wherein the alkyl group consists of a $C_{10}$–$C_{20}$ straight or branched chain-nucleus and the alkoxylation is effected by ethylene oxide, propylene ethoxide, methylethylene oxide or the like. Evidence indicates that there are multiple units of alkoxylation in the molecule to provide a general formula:

$$[R-(O-R')_n-SO_4]-NH_4$$

where $n = 1$ to $4$,
$R = C_{10}-C_{20}$ alcohol derivative,
$R' =$ ethylene, propylene nucleus and the like.

In addition to the ammonium salts, other salts of alkoxylated alcoholic sulfates are useful such as those obtained from the alkali, the alkaline earth metals, or the organic amine salts such as mono, di, or triethanol amine salts, etc.

The foam-generating material to be suitably water retentive must further include an alcohol such as lauryl alcohol or its equivalent to reduce the excessive drainage rate whereby the foam will remain sufficiently "wet" for appreciable periods, making it effective in combatting the fire or decontaminating the atmosphere depending upon the particular application.

The described material, depending upon the apparatus used, will generate foam ranging in expansion ratio from 50–2000/1 to low expansion ratio foam of the order of 10/1 and in either instance the foam material combines the requisite characteristics making it suitable for fire control.

From the following examples it will be seen that although ethoxylated ammonium lauryl sulfate however will generate satisfactory foam with very hard water, the drainage rate is excessive and the excessive drainage rate is not correctable by increasing the amount of ethoxylated ammonium lauryl sulfate. When lauryl alcohol is added to the ethoxylated ammonium lauryl sulfate, a foam generated with high hardness water (this being the more difficult type foam material to work with), exhibits improved water retentiveness the same as is the case with foam produced using an ordinary hardness water. These results are illustrated in the following specific examples.

Example I

Foaming agent: 29% ethoxylated ammonium lauryl sulfate.
Additives: None.
Solution preparation: 156 grams 29% ethoxylated ammonium lauryl sulfate diluted to 3 gal. with tap water
Active concentration: 400 mg./100 ml. tap water (50–100 p.p.m. hardness).
Solution temperature: 20° C.

| | Sample 1 | | Sample 2 | |
|---|---|---|---|---|
| Weight of entrapped foam at time zero, g. | 194 | | 148 | |
| Drain time, min. | Ml. drained | Weight percent left | Ml. drained | Weight percent left |
| 4 | 159 | 18 | 130 | 12 |
| 7 | 173 | 11 | 138 | 7 |
| 10 | 178 | 8 | 140 | 5 |
| 15 | 180 | 7 | 143 | 3 |
| 30 | 188 | 3 | 145 | 2 |

Example II

Foaming agent: 29% active ethoxylated ammonium lauryl sulfate.
Additives: None.
Solution preparation: 312 grams 29% ethoxylated ammonium lauryl sulfate diluted to 3 gal. with tap water.
Active concentration: 800 mg./100 ml. of tap water.
Solution temperature: 20° C.

| | Sample 1 | | Sample 2 | |
|---|---|---|---|---|
| Weight of entrapped foam at time zero, g. | 209 | | 196 | |
| Drain time, min. | Ml. drained | Weight percent left | Ml. drained | Weight percent left |
| 4 | 163 | 22 | 158 | 19 |
| 7 | 181 | 13 | 176 | 10 |
| 10 | 188 | 10 | 184 | 6 |
| 15 | 193 | 8 | 189 | 4 |
| 30 | 198 | 5 | 191 | 3 |

When lauryl alcohol is now added to the ethoxylated ammonium lauryl sulfate, as shown in the following Example III, the water retentiveness of the foam is substantially improved, and when the lauryl alcohol content is further increased as indicated in the following Examples IV, V and VI, the water retentiveness successively increases.

Example III

Foaming agent: 29% ethoxylated ammonium lauryl sulfate.
Additives: lauryl alcohol, 20 mg./100 ml.
Solution preparation: 183 grams 29% ethoxylated ammonium lauryl alcohol diluted to 3.5 gal. with tap water (2.6 grams lauryl alcohol as free alcohol in the 183 grams).

Active concentration: 400 mg. ethoxylated ammonium lauryl sulfate/100 ml. of tap water.

Solution temperature: 20° C.

| Weight of entrapped foam at time zero, g.. | Sample 1 | | Sample 2 | |
|---|---|---|---|---|
| | 195 | | 201 | |
| Drain time, min. | Ml. drained | Weight percent left | Ml. drained | Weight percent left |
| 4 | 134 | 31 | 143 | 29 |
| 7 | 159 | 18 | 168 | 16 |
| 10 | 170 | 13 | 180 | 10 |
| 15 | 178 | 9 | 186 | 7 |
| 30 | 184 | 6 | 191 | 5 |

*Example IV*

Foaming agent: 29% ethoxylated ammonium lauryl sulfate.
Additives: lauryl alcohol, 30 mg./100 ml. of tap water.
Solution preparation: 183 grams 29% ethoxylated ammonium lauryl sulfate plus 4.0 grams lauryl alcohol diluted to 3.5 gal. with tap water.
Active concentration: 400 mg./100 ml.
Solution temperature: 20° C.

| Weight of entrapped foam at time zero, g.. | Sample 1 | | Sample 2 | |
|---|---|---|---|---|
| | 194 | | 199 | |
| Drain time, min. | Ml. drained | Weight percent left | Ml. drained | Weight percent left |
| 4 | 33 | 83 | 33 | 84 |
| 7 | 72 | 63 | 73 | 63 |
| 10 | 95 | 51 | 95 | 52 |
| 15 | 113 | 42 | 114 | 43 |
| 30 | 155 | 20 | 156 | 22 |

*Example V*

Foaming agent: 29% ethoxylated ammonium lauryl sulfate.
Additives: lauryl alcohol, 40 mg./100 ml. of tap water.
Solution preparation: 183 grams 29% ethoxylated ammonium lauryl sulfate plus 5.3 grams lauryl alcohol diluted to 3.5 gal. with tap water.
Active concentration: 40 mg./100 ml.
Solution temperature: 20° C.

| Weight of entrapped foam at time zero, g.. | Sample 1 | | Sample 2 | |
|---|---|---|---|---|
| | 213 | | 230 | |
| Drain time, min. | Ml. drained | Weight percent left | Ml. drained | Weight percent left |
| 4 | 27 | 87 | 28 | 88 |
| 7 | 68 | 68 | 69 | 70 |
| 10 | 98 | 54 | 101 | 56 |
| 15 | 128 | 40 | 134 | 42 |
| 30 | 167 | 22 | 175 | 24 |

*Example VI*

Foaming agent: 29% ethoxylated ammonium lauryl sulfate.
Additives: lauryl alcohol, 50 mg./100 ml.
Solution preparation: 183 grams 29% ethoxylated ammonium lauryl sulfate plus 6.7 grams lauryl alcohol diluted to 3.5 gal. with tap water.

Active concentration: 400 mg./100 ml. of tap water.
Solution temperature: 21° C.

| Weight of entrapped foam at time zero, g.. | Sample 1 | | Sample 2 | |
|---|---|---|---|---|
| | 277 | | 283 | |
| Drain time, min. | Ml. drained | Weight percent left | Ml. drained | Weight percent left |
| 4 | 34 | 88 | 34 | 88 |
| 7 | 85 | 69 | 86 | 70 |
| 10 | 119 | 57 | 120 | 57 |
| 15 | 158 | 43 | 158 | 44 |
| 30 | 207 | 25 | 212 | 25 |

Comparing next Example VII with Example I, it will be seen that the ethoxylated ammonium lauryl sulfate is equally efficient in producing foam with a hard water in the order of 500 parts per million as it is with much softer water; but, the drainage rate is equally poor. When however as shown next in Examples VIII and IX lauryl alcohol is added to the ethoxylated ammonium lauryl sulfate the foam generated with 2500 parts per million hardness water, still produces an effective quantity of foam and the water retentiveness of the foam is excellent.

*Example VII*

Foaming agent: 29% ethoxylated ammonium lauryl sulfate.
Additives: None.
Solution preparation: 156 grams 29% ethoxylated ammonium lauryl sulfate diluted to 3 gal. with 500 parts per million hard water.
Active concentration: 400 mg./100 ml.
Solution temperature: 20° C.

| Weight of entrapped foam at time zero, g.. | Sample 1 | | Sample 2 | |
|---|---|---|---|---|
| | 172 | | 168 | |
| Drain time, min. | Ml. drained | Weight percent left | Ml. drained | Weight percent left |
| 4 | 141 | 18 | 139 | 17 |
| 7 | 153 | 11 | 150 | 11 |
| 10 | 156 | 9 | 155 | 8 |
| 15 | 160 | 7 | 158 | 6 |
| 30 | 166 | 3 | 165 | 2 |

*Example VIII*

Foaming agent: 29% ethoxylated ammonium lauryl sulfate.
Additives: lauryl alcohol, 30 mg./100 ml.
Solution preparation: 183 grams 29% ethoxylated ammonium lauryl sulfate plus 4.0 grams lauryl alcohol diluted to 3.5 gal. with 2500 parts per million hard water.
Active concentration: 400 mg./100 ml.
Solution temperature: 19° C.

| Weight of entrapped foam at time zero, g.. | Sample 1 | | Sample 2 | |
|---|---|---|---|---|
| | 197 | | 199 | |
| Drain time, min. | Ml. drained | Weight percent left | Ml. drained | Weight percent left |
| 4 | 65 | 67 | 63 | 68 |
| 7 | 108 | 45 | 104 | 48 |
| 10 | 125 | 37 | 125 | 37 |
| 15 | 150 | 24 | 147 | 26 |
| 30 | 170 | 14 | 170 | 15 |

*Example IX*

Foaming agent: 29% ethoxylated ammonium lauryl sulfate.
Additives: lauryl alcohol, 70 mg./100 ml.
Solution preparation: 363 grams 29% ethoxylated ammonium lauryl sulfate plus 9.3 grams lauryl alcohol diluted to 3.5 gal. with synthetic sea water.
Active concentration: 800 mg./100 ml.
Solution temperature: 19° C.

| Weight of entrapped foam at time zero, g__ | Sample 1 | | Sample 2 | |
|---|---|---|---|---|
| | 185 | | 169 | |
| Drain time, min. | Ml. drained | Weight percent left | Ml. drained | Weight percent left |
| 4 | 25 | 86 | 20 | 88 |
| 7 | 67 | 64 | 53 | 69 |
| 10 | 83 | 55 | 73 | 57 |
| 15 | 108 | 42 | 97 | 43 |
| 30 | 135 | 27 | 126 | 25 |

Referring to Example IX, where synthetic sea water (see Naval Aircraft Factory Process Spec. PS–1, Navy Dept. Spec. 44T27B, dated July 1, 1940), is used for generating foam, this example shows it is possible with a proper combination of ethoxylated ammonium lauryl sulfate and lauryl alcohol to generate foam in substantial quantities; said foam is stable, is of an appropriate average size and is water retentive. Even after 30 minutes following generation of the foam, there remains a 27% water content foam without sign of either cloudiness or precipitation.

It would normally have been expected, that using sea water, would produce only a thick curd, but that no foam would or could be generated; or, if any foam were to be produced, it would be quite unstable. Contrary, however to the expected result, there is produced a good quality foam which is stable, of a high water content, and water retention is good so that even after thirty minutes the moisture content can provide effective fire-fighting qualities.

In order to retain the components in solution, pending use, and to maintain the composition at an acceptable viscosity, I include small but effective amounts of isopropanol or other lower boiling point carbinols, this material being not critical in its amount, but sufficient to maintain a liquid condition of the material at 20° F. and a 50 cps. viscosity at approximately 15% active content material. Generally, about 5–15% by weight of the carbinol is sufficient for this purpose.

The surfactant of this invention, can be varied of course to produce any desired ratio of foam to liquid which is consistent with the given fire-fighting or decontaminating operation. For usages dictating light billowy transportable foam, an expansion ratio of 1000:1 foam to liquid is provided and in other apparatus such as for home use, cars, trucks, stand-by factory equipment, etc., foams having a lower expansion ratio can be produced. In the high expansion foams, analysis of the foam material indicates 2 to 5% of surfactant is present therein, the surfactant, in turn, consisting of 15% active material. The lower expansion ratio materials are denser, slower draining, and less easily transported. Consequently, the low expansion foams are less effective in fighting fires from a distance but are more effective for longer periods of time, being slower draining material.

Foam materials of the present invention are uniformly of low draining qualities and can be formulated to be relatively insensitive to any hardness water. The surfactants also have an acceptable viscosity with a 15% active material content and all generally have a sufficiently low cloud point for storage purposes.

The ammonium alkyl ether sulfate of the present invention can be produced by alkoxylation of long chain alcohols other than lauryl, followed by sulfonation and neutralization in the usual manner to provide equivalent materials. Thus, the formulator has opportunity for producing ethers of ammonium myristyl sulfate or other higher carbon content alcohols depending upon his specific selection of starting material. Also, the ammonium alkyl ether sulfate is usable with alcohols other than lauryl alcohol when high or low hardness water is employed. An example of a fatty alcohol other than lauryl alcohol is provided in the following Example X.

*Example X*

Foaming agent: 29% ethoxylated ammonium lauryl sulfate.
Additives: myristyl alcohol, 40 mg./100 ml.
Solution preparation: 183 grams 29% ethoxylated ammonium lauryl sulfate plus 5.3 grams myristyl alcohol diluted to 3.5 gal. with tap water
Active concentration: 400 mg./100 ml. of tap water
Solution temperature: 21° C.

| Weight of entrapped foam at time zero, g__ | Sample 1 | | Sample 2 | |
|---|---|---|---|---|
| | 504 | | 581 | |
| Drain time, min. | Ml. drained | Weight percent left | Ml. drained | Weight percent left |
| 4 | 272 | 46 | 314 | 46 |
| 7 | 337 | 33 | 372 | 36 |
| 10 | 387 | 23 | 425 | 27 |
| 15 | 408 | 19 | 465 | 20 |
| 30 | 443 | 12 | 505 | 13 |

The myristyl alcohol addition now can be compared with lauryl alcohol as follows:

*Example XI*

Foaming agent: same as Example X.
Additives: lauryl alcohol, 40 mg/100 ml.
Solution preparation: Same as Example X but 5.3 grams of lauryl alcohol in place of 5.3 grams of myristyl alcohol.
Active concentration: same as Example X.
Solution temperature: 23° C.

| Weight of entrapped foam at time zero, g__ | Sample 1 | | Sample 2 | |
|---|---|---|---|---|
| | 663 | | 679 | |
| Drain time, min. | Ml. drained | Weight percent left | Ml. drained | Weight percent left |
| 4 | 245 | 63 | 238 | 65 |
| 7 | 371 | 44 | 353 | 48 |
| 10 | 417 | 37 | 400 | 41 |
| 15 | 484 | 27 | 468 | 31 |
| 30 | 569 | 14 | 570 | 16 |

The two alcohol additions (Examples X and XI) can now be compared with no fatty alcohol in Example XII:

*Example XII*

Foaming agent: 29% ethoxylated ammonium lauryl sulfate.
Additives: None.
Solution preparation: 183 grams 29% ethoxylated ammonium lauryl sulfate diluted to 3.5 gal. with tap water.
Solution temperature: 23° C.
Active concentration: 400 mg/100 ml. of tap water

| Weight of entrapped foam at time zero, g__ | Sample 1 | | Sample 2 | |
|---|---|---|---|---|
| | 194 | | 148 | |
| Drain time, min. | Ml. drained | Weight percent left | Ml. drained | Weight percent left |
| 4 | 159 | 18 | 128 | 17 |
| 7 | 173 | 11 | 137 | 3 |
| 10 | 179 | 8 | 140 | 5 |
| 15 | 181 | 7 | 143 | 3 |
| 30 | 189 | 3 | 145 | 2 |

From these examples, will be seen that cyristyl alcohol, while not as efficient as lauryl alcohol, still provides a substantial improvement factor on the drainage rate of foam materials which do not include a fatty alcohol material.

From the foregoing discoveries, improved foam-generating materials with both high and low hardness waters, can be represented by the following general formula:

$$[R-(OR')_n-SO_4]-X$$

where R is a long chain alcohol having 10 to 20 carbon atoms, R' is a lower alkoxy material obtained from ethylene oxide or the like, and X is an alkali, an alkaline earth, or an organic amine radical.

OPERATION

The compositions described, produce foam with either soft water or hard water having a hardness as high as sea water. Regardless of the type of water the operation is essentially the same. For high expansion foam generation air is aspirated into diluted foam-producing agent in the manner described in copending application Serial No. 13,103. Briefly, this operation is as follows:

A solution of air foam concentrate is generally provided by dissolving the active ingredient or solution thereof in sufficient water to provide a 15% active ingredient solution. To this is then added sufficient alcohol to provide the desired drainage rate. The alcohol can be added to a concentrated solution of the active ingredient to provide the 15% by weight concentration. This solution is then remixed with additional water to provide an air foam liquid which is about 3%–6% by volume of the concentrated solution. It should be understood that these proportions are not critical and they represent only one of numerous different concentrations of material.

The air foam solution is sprayed by nozzles onto a net which is wetted by said spray and a draft of air, either forced draft or natural draft, is then passed through the net and in passing through the net openings, the foam material is blown into light, billowy bubbles which have the necessary water content for smothering fires.

The foam material is generated by an air velocity of between about 80 feet per minute to about 600 feet per minute and the volume of foam which is produced is propelled forwardly of the net by the air stream which is used for forming the foam. The foam is urged to the site of the fire so that the foam-generating equipment can be located remotely from the fire and out of the direct vicinity of high heat and noxious fumes which prevent close-up fire fighting. Typically, I generate foam at the rate of about 1000 cubic feet per minute and therefore can fill very large spaces with the foam in a matter of a few moments.

The net, over which the solution is sprayed, can be inclined and is either planar or corrugated to prevent loss of the foam-generating material by drainage.

When the foam material reaches, and envelops the fire, it will have retained sufficient water content to vaporize into steam which, in turn, is retained in the vicinity of the fire by the surrounding mass of bubbles and will therefore smother the fire by depriving the fire of the necessary amount of oxygen to support combustion. The foam also fights fire by another principle, namely by cutting down on the radiant energy of the fire. For example, in an oil-type fire, when combustion once starts the radiant energy serves to crack the hydrocarbon materials into lower more inflammable hydrocarbon content. The foam material, in addition to smothering the ignited portion of the oil, also cuts down on radiation of the fire because the fire is completely surrounded and the foam consequently prevents thermal cracking of the oil in the vicinity of the fire. In this way, the foam operates on two distinct principles, shielding and smothering, to bring under control this very difficult and unmanageable type of fire.

Another contemplated usage of my invention is in the field of decontamination. For example, in a certain area having radioactive particles dispersed in the atmosphere, it is possible to generate out of the fixed volume of atmosphere a large mass of bubbles. That is, the foam-generating equipment can be located within the fixed volume and proceeds to "capture" all of the contaminated atmosphere within bubble formations. For a period of time, as for example 25 minutes or so, all of the atmosphere is maintained in aspirated condition with foam. The foam generator is kept operating to generate foam at the same rate it is broken down. The slight radioactive particles, some of which are very small, in the order of micron and submicron size will impinge the inner surface of the foam and being wetted, will be carried down with the drainage of the foam as it fractures into liquid phase and releases the inner air. During the 25 minute period or so, all of the radioactive particles will become wetted and will be carried down with the foam until it reaches the floor where it is washed away. From actual test experience, virtually all airborne radioactive material can be removed in the manner described by the foam material.

One of the important advantages of the foam which is generated in the present invention is that there is a sufficient oxygen content of the foam to permit breathing within an atmosphere of this foam material and therefore there is substantially less hazard presented to personnel in the vicinity of the fire. Also, since the foam material can be used with any source water, it is especially adapted for use on shipboards, docks, warehouses and the like which are in the vicinity of fresh or salt water.

The foam material is variable in size, ranging from emulsion size to much larger size making it light and billowy enough to permit ease of transport depending upon the apparatus used. The foam material also possesses a sufficient water content to effect smothering, but not so much as to produce damage to the area being treated. For example, a site filled with bubbles constituting my present invention is exposed to substantially less water than is the case where streams of water are sprayed within the site. In conventional systems the practice is to literally soak the entire area, so that as much damage from water is produced as by fire. Water damage is almost negligible in the present invention because of the slight moisture content in the bubbles as compared with water flow type of fire control. It should be understood however that there must be some minimal quantity of water in the bubbles otherwise, if they are too "dry" insufficient steam is generated to effect smothering of the fire. That, of course, is the reason for inclusion of the 10 to 20 carbon atom alcohol, to improve the water retentiveness of the bubbles so that they will retain a sufficient water content.

By reason of the present invention, which produces a foam-generating material suitable for use with either fresh or salt water or any range of hardness therebetween, it is possible to greatly increase the scope of usage of the apparatus disclosed in application Serial No. 13,103, with all of its inherent versatility and important advantages by way of safer, quicker and less damage-producing fire control, thus adding importantly to the art of fire control.

FOAM GENERATION WITH SOFT WATER

By soft water, is meant water having ordinary hardness, i.e., a mineral content of about 50–100 parts per million of water as calcium carbonate equivalent.

When water is used having low hardness a detergent base material, such as ammonium lauryl sulfate is usable as the foam-producing agent. One such material is marketed under the trademark "Maprofix N.H." and is obtainable from "Onyx Chemical Corporation" of Jersey City, New Jersey.

Two solutions of 28½% ammonium lauryl sulfate, when mixed with four gallons of tap water had in each case, the same active concentration of material, but one was modified by the addition of lauryl alcohol in the amount of 40 mg./100 ml. of final solution. The addition of lauryl alcohol substantially reduced the drainage rate of the foam, making the foam material more effective over greater distances from the foam-generating machine. The time period required for advancing the foam from the generating machine to the site of the fire is not so great that the foam will have lost an effective water content at the time it reaches the site of the fire. The results of this discovery are embodied in the following two examples.

*Example XIII*

Foaming agent: 28.5% ammonium lauryl sulfate and 1.69% free fatty alcohol.
Additives: none
Solution preparation: 213 grams of 28.5% ammonium lauryl sulfate diluted to 4.0 gal. of solution with tap water.
Active concentration: 400 mg./100 ml. of tap water.
Solution temperature: 19° C.

| Weight of entrapped foam at time zero, g__ | Sample 1 | | Sample 2 | |
|---|---|---|---|---|
| | 147 | | 149 | |
| Drain time, min. | Ml. drained | Weight percent left | Ml. drained | Weight percent left |
| 4 | 60 | 59 | 62 | 58 |
| 7 | 92 | 37 | 94 | 37 |
| 10 | 108 | 27 | 110 | 26 |
| 15 | 121 | 18 | 123 | 17 |
| 30 | 134 | 9 | 137 | 8 |

*Example XIV*

Foaming agent: 28.5% ammonium lauryl sulfate and 1.69% free fatty alcohol
Additives: lauryl alcohol, 40 mg./100 ml. of tap water
Solution preparation: 187 grams 28.5% ammonium lauryl sulfate plus 5.3 grams of lauryl alcohol diluted to 3.5 gal. with tap water
Active concentration: 400 mg./100 ml. of tap water
Solution temperature: 20° C.

| Weight of entrapped foam at time zero, g__ | Sample 1 | | Sample 2 | |
|---|---|---|---|---|
| | 146 | | 154 | |
| Drain time, min. | Ml. drained | Weight percent left | Ml. drained | Weight percent left |
| 4 | 7 | 95 | 7 | 95 |
| 7 | 28 | 81 | 27 | 82 |
| 10 | 47 | 68 | 46 | 70 |
| 15 | 70 | 52 | 71 | 54 |
| 30 | 99 | 32 | 103 | 33 |

These data can be readily interpreted to show that small additions of lauryl alcohol will cause the foam to retain, for longer periods, a high quantity of fluid and since the foam must have a substantial quantity of fluid at the time that it reaches the side of the fire for adequate control purposes, the addition of lauryl alcohol lends a surprising and substantial improvement. Moreover, comparing next the following three examples, which consist of ammonium lauryl sulfate and lauryl alcohol, it will be seen, that the Example XV, which is suitable with tap water having a hardness of about 100 parts per million will produce an adequate foam material having good retentiveness and foam quality; but, when the material is then used with hard water as for example 1000 parts per million as indicated in Example XVI, the foam quality is inadequate and the drainage rate is excessive. In the case of Example XVII, when the hardness is increased 2000 parts per million, practically no foam at all is producible. Obviously, this combination of materials will be unsatisfactory to produce high expansion foams with sea water, which has a hardness far in excess of 2000 parts per million.

The effects of various additions of lauryl alcohol to ammonium lauryl sulfate can be fully demonstrated in the following data, which compares the drainage rate over the same periods of time for compositions differing from each other by various amounts of lauryl alcohol added thereto. These illustrate that lauryl alcohol will have a surprisingly disproportional effect on the drainage rate of the foam and the water retentiveness of the foam increases with increasing amount of lauryl alcohol.

*Example XV*

Foaming agent: 28.5% ammonium lauryl sulfate and 1.69% free fatty alcohol.
Additives: lauryl alcohol, 13 mg./100 ml.
Solution preparation: 184 grams of 28.5% ammonium lauryl sulfate plus 1.5 grams of lauryl alcohol diluted to 3.5 gal. with tap water.
Active concentration: 400 mg./100 ml. of tap water.
Solution temperature: 21° C.

| Weight of entrapped foam at time zero, g__ | Sample 1 | | Sample 2 | |
|---|---|---|---|---|
| | 158 | | 160 | |
| Drain time, min. | Ml. drained | Weight percent left | Ml. drained | Weight percent left |
| 4 | 20 | 87 | 21 | 87 |
| 7 | 50 | 68 | 50 | 69 |
| 10 | 73 | 54 | 72 | 55 |
| 15 | 90 | 43 | 90 | 44 |
| 30 | 117 | 26 | 122 | 24 |

*Example XVI*

Foaming agent: same as Example XV.
Additives: same as Example XV.
Solution preparation: same as Example XV but diluted to 3.5 gal. with 1000 parts per million hard water.
Active concentration: 400 mg./100 ml. of 1000 parts per million hard water.
Solution temperature: 21° C.

| Weight of entrapped foam at time zero. | Sample 1 | Sample 2 | |
|---|---|---|---|
| | Not enough foam to obtain drainage data. | 530 g. | |
| Drain time, min. | | Ml. drained | Weight percent left |
| 4 | | 240 | 55 |
| 7 | | 337 | 36 |
| 10 | | 375 | 29 |
| 15 | | 420 | 21 |
| 30 | | 470 | 11 |

*Example XVII*

Foaming agent: same as Examples XV and XVI.
Additives: same as Examples XV and XVI.
Solution preparation: same as Example XV but diluted to 3.5 gal. with 2000 parts per million hard water.
Active concentration: 400 mg./100 ml. of 2000 parts per million hard water.
Solution temperature: 20° C.
Remarks: No foam produced.

Referring now to the following data containing Examples VIII, XIX and XX, it will be seen that lauryl alcohol, while being an optimum alcohol to effect water retention of the foam, also has an approximate equivalent in myristyl alcohol (Example XX) and it can be seen that even decyl alcohol (Example XIX) provides a factor of improvement though not as significant as either lauryl or myristyl alcohol.

The alcohols, having a carbon content from $C_{10}$ to $C_{20}$ composition, both straight and branched chains, have been investigated and are found, as a class to effect a surprising factor of improvement in the water retention of the foam. The lauryl alcohol, however, is the outstanding one of these alcohols. I do not have any ready basis for explaining this experimental result by which lauryl alcohol proves to be superior over the other members of the alcohol class, but there is ample experimental evidence to show that this material is the optimum material for my purposes.

*Example XVIII*

Foaming agent: 28.5% ammonium lauryl sulfate and 1.69% free fatty alcohol.
Additives: lauryl alcohol, 20 mg./100 ml.
Solution preparation: 187 grams 28.5% ammonium lauryl sulfate plus 2.6 grams of lauryl alcohol diluted to 3.5 gal. with tap water.
Active concentration: 400 mg./100 ml. of tap water.
Solution temperature: 21° C.

|  | Sample 1 | | Sample 2 | |
| --- | --- | --- | --- | --- |
| Weight of entrapped foam at time zero, g.. | 186 | | 183 | |
| Drain time, min. | Ml. drained | Weight percent left | Ml. drained | Weight percent left |
| 4 | 2 | 99 | 2 | 99 |
| 7 | 7 | 96 | 7 | 96 |
| 10 | 24 | 87 | 24 | 87 |
| 15 | 50 | 73 | 51 | 72 |
| 30 | 106 | 43 | 108 | 41 |

*Example XIX*

Foaming agent: 28.5% ammonium lauryl sulfate and 1.69% free fatty alcohol.
Additives: decyl alcohol, 17 mg./100 ml.
Solution preparation: 187 grams of 28.5% ammonium lauryl sulfate plus 2.2 grams of decyl alcohol diluted to 3.5 gal. with tap water.
Active concentration: 400 mg./100 ml. of tap water.
Solution temperature: 21° C.

|  | Sample 1 | | Sample 2 | |
| --- | --- | --- | --- | --- |
| Weight of entrapped foam at time zero, g.. | 146 | | 122 | |
| Drain time, min. | Ml. drained | Weight percent left | Ml. drained | Weight percent left |
| 4 | 101 | 31 | 87 | 29 |
| 7 | 126 | 14 | 106 | 13 |
| 10 | 132 | 10 | 113 | 7 |
| 15 | 139 | 5 | 119 | 2 |
| 30 | 145 | 1 | 121 | 1 |

*Example XX*

Foaming agent: 28.5% ammonium lauryl sulfate and 1.69% of free fatty alcohol.
Additives: myristyl alcohol, 23 mg./100 ml.
Solution preparation: 187 grams 28.5% ammonium lauryl sulfate plus 3.0 grams of myristyl alcohol diluted to 3.5 gal. with tap water.
Active concentration: 400 mg./100 ml. of tap water.
Solution temperature: 22° C.

|  | Sample 1 | | Sample 2 | |
| --- | --- | --- | --- | --- |
| Weight of entrapped foam at time zero, g.. | 196 | | 203 | |
| Drain time, min. | Ml. drained | Weight percent left | Ml. drained | Weight percent left |
| 4 | 6 | 97 | 6 | 97 |
| 7 | 27 | 86 | 20 | 90 |
| 10 | 51 | 74 | 42 | 79 |
| 15 | 84 | 57 | 76 | 62 |
| 30 | 133 | 32 | 136 | 32 |

From these foregoing Examples XIII–XIX, the lauryl alcohol or other alcohol is added as a supplement to the free fatty alcohol present in the foaming agent such that the total free fatty alcohol is in proportion to ammonium lauryl sulfate in amounts providing an appropriate degree of foaming action. The amount of free fatty alcohol is adjusted by addition so that it never falls below an amount wherein the weight ratio of ammonium lauryl sulfate to free fatty alcohol is in excess of about 14.2 to 1.

The foam-producing materials, as for example, one containing 28½% by weight of ammonium lauryl sulfate and 2½% by weight lauryl alcohol, diluted 1 to 1 with distilled water, tends to become viscous at low temperatures, particularly in the orders of 10° C. At about 5° C. the material tends to become a solid. Obviously, such a material if stored for fire-fighting purposes cannot be allowed to become a solid and neither can it be allowed to become too viscous thereby impeding usage when the material is needed. Therefore, to safeguard the material, I have found it advisable to include amounts of a low series aliphatic carbinol such as isopropanol which can be added to the foam-producing material to improve its storability and to prevent both solidification and objectionable increase in viscosity pending usage. In this case, the low molecular weight alcohol is presumed to serve as both a solubilizer and a freezing-point depressant. Other low molecular weight alcohols such as ethanol, n-propanol, primary, secondary and tertiary butanol are also usable. Other low carbinols will be suggested from these example materials.

Although the present invention, has been illustrated and described in connection with certain example formulations of the invention, it will be understood that those skilled in this art can make numerous formulation changes, additions, and variations to suit individual design preferences and it is intended that such variations and changes to come within the scope of the present invention, will be included within the terms of the following claims as equivalents of the invention.

I claim as my invention:

1. The method of generating a fire extinguishing high expansion foam which comprises mixing a liquid concentrate consisting essentially of the ammonium alkyl ether sulfate of about 4 mols of ethylene oxide with one mole of $C_{10}$ to $C_{20}$ aliphatic fatty alcohol, and an aliphatic fatty alcohol selected from the class consisting of lauryl alcohol and myristyl alcohol in an amount of up to 12½% by weight of said sulfate, adding said concentrate to water having a hardness range from soft water to very hard water approaching the hardness of sea water; wetting a net with said mixture, and blowing air through said net to form bubbles having an expansion ratio of total foam volume of between about 50/1 to 2000/1, so as to effectively blanket and smother a fire.

2. The method of generating a fire extinguishing, high expansion foam which comprises mixing a liquid concentrate consisting essentially of the ammonium alkyl ether sulfate of about 4 moles of ethylene oxide with one mole of lauryl alcohol in the amount of about 15% to 30%, by weight, and an aliphatic fatty alcohol selected from the class consisting of lauryl alchol and myristyl alcohol, in the amount of about 1.4% to 3.5% by weight, adding said concentrate to water having a hardness range from soft water to very hard water approaching the hardness of sea water; wetting a net with said mixture, and blowing air through said net to form bubbles having an expansion ratio of total foam volume of between about 50/1 to 2000/1, so as to effectively blanket and smother a fire.

3. The method of generating a fire extinguishing, high expansion foam which comprises mixing a liquid concentrate consisting essentially of a salt of lauryl ether sulfate of about 4 moles of ethylene oxide with one mole of lauryl alcohol where the cation of the salt is ammonium in the amount of 15 to 30% by weight, and an aliphatic fatty alcohol selected from the class consisting of lauryl alcohol and myristyl alcohol in the amount of about 1.4% to 3.5% by weight, adding said concentrate to water having a hardness range from soft water to very hard water approaching the hardness of sea water; wetting a net with said mixture, and blowing air through said net to form bubbles having an expansion ratio of total foam volume of between about 50/1 to 2000/1, so as to effectively blanket and smother a fire.

References Cited by the Examiner

UNITED STATES PATENTS

| | | | |
|---|---|---|---|
| 2,114,042 | 4/38 | Bertsch | 252—3 |
| 2,165,997 | 7/39 | Daimler et al. | 252—3 |
| 2,766,212 | 10/56 | Grifo | 252—307 XR |
| 2,770,600 | 11/56 | Ricciardi | 252—161 XR |
| 2,772,239 | 11/56 | Lewis et al. | 252—161 |
| 2,861,956 | 11/58 | Fernandez | 252—89 |
| 2,879,231 | 3/59 | Allen et al. | 252—90 |
| 2,941,950 | 6/60 | Korpi et al. | 252—89 |

OTHER REFERENCES

Journal of American Oil Chemists Society, vol. 27, pp. 268–73 (1950).

Journal of Colloid Science, vol. 8, pp. 491–507, 1953.

Journal of Physical Chemistry, vol. 62, pp. 159–166, 1958.

Journal of American Oil Chemists Society, vol. 30, p. 190, 1953.

Chemical Abstracts, vol. 48, p. 11818g, Abstractor, Katsuya Inouye, 1954.

Chemical Abstracts, vol. 53, p. 13687a, Abstractor, Donald Hamm, 1959.

JULIUS GREENWALD, *Primary Examiner.*

JOSEPH R. LIBERMAN, *Examiner.*